United States Patent [19]

Lündsgart

[11] 3,981,478

[45] Sept. 21, 1976

[54] FLUID FLOW CONTROL VALVE

[75] Inventor: Henning Börge Lündsgart, Karlslunde, Denmark

[73] Assignee: Dansk Industri Syndikat A/S, Herlev, Denmark

[22] Filed: Sept. 30, 1975

[21] Appl. No.: 618,016

[30]   Foreign Application Priority Data
   Oct. 11, 1974   Denmark .......................... 5358/74

[52] U.S. Cl. .................................. 251/29; 251/30
[51] Int. Cl.² ...................................... F16K 31/122
[58] Field of Search ......................... 251/29, 28, 30

[56]   References Cited
   UNITED STATES PATENTS
   3,350,054   10/1967   Wray et al. ......................... 251/29
   FOREIGN PATENTS OR APPLICATIONS
   930,548   7/1963   United Kingdom .................. 251/30

141,709   12/1960   U.S.S.R. ............................. 351/29

Primary Examiner—Arnold Rosenthal
Attorney, Agent, or Firm—Imirie, Smiley & Linn

[57]   ABSTRACT

A fluid flow control valve having a valve member which is urged away from a cooperating seat by the combined pressures at the valve inlet and outlet and urged towards the seat by fluid pressure prevailing in a chamber which is connected to the valve inlet or outlet, respectively, dependent upon whether an order signal requires the valve to close or to open. Connection between said chamber and the valve inlet and outlet is controlled by an auxiliary valve which in turn is actuated through pressure transmitting lines connected to the inlet and outlet via a switch valve actuated by the order signal.

4 Claims, 3 Drawing Figures

FLUID FLOW CONTROL VALVE

BACKGROUND OF THE INVENTION

The present invention relates to a fluid flow control valve which is actuated by the fluid proper. The valve comprises a valve housing formed with a seat for cooperating with a valve member linearly displaceable in the housing, a first and a second chamber located at either side of the valve seat and a differential or stepped piston rigidly connected to the valve member. The smaller surface of the piston is subjected to the fluid pressure prevailing in the first chamber while the opposed larger surface of the piston is subjected to a fluid pressure prevailing in a third chamber which via a switch valve may be connected selectively to the first or to the second chamber.

In a prior art valve of the kind referred to, switching of the switch valve from one position to the other results in a direct change in the pressure prevailing in the third chamber and hence a reversal of the direction of the resultant force exerted by the opposed fluid pressures acting on opposite sides of the stepped piston, which in turn causes either opening or closing of the flow control or main valve. Consequently, the switch valve functions as a pilot valve which permits the actuation of the main valve by means of relatively small actuating forces.

SUMMARY OF THE INVENTION

According to the invention there is provided a fluid flow control valve, comprising in combination:

a valve housing having a first and a second chamber, a valve seat in said housing between said first and second chambers, a valve member linearly displaceable in said housing for cooperating with said valve seat, a stepped piston rigidly connected to said valve member and having a first active surface subjected to the fluid pressure in said first chamber and an opposed second active surface of larger area, which second piston surface together with said housing defines a third chamber, a four-way two-position switch valve having a first inlet port connected to said first chamber, a second inlet port connected to said second chamber, a first outlet port and a second outlet port, and signal receiving means for switching the valve to selectively connect each inlet port with one or the other outlet port, a three-way two-position auxiliary valve having first, second and third ports connected to said first, second and third chamber, respectively, and fluid actuated means for selectively switching said auxiliary valve between a first position in which its said first and third ports are connected, and a second position in which its said second and third ports are connected, and duct means connecting said fluid actuated means to said first and second outlet ports, respectively, of said switch valve.

A flow control valve according to the invention has the advantage that its function is determined only by the signal received by the switch valve, whereas it is independent of the direction of the fluid flow, i.e. whether one or the other of said first and second chambers is connected to the inlet or to the outlet of the valve. The correct function will not be disturbed by a momentary or transient reversal of the flow direction resulting in changed pressure conditions in said chambers.

This is due to the fact that with a given position of the switch valve, as determined by the order signal referred to above, the auxiliary valve will be switched from one position to the other when the fluid flow reverses, due to the accompanying reversal of the pressure differential acting upon its associated fluid actuated switching means. Consequently, the auxiliary valve ensures that the desired relatively high or relatively low pressure, as determined by the order signal, always prevails at the larger surface of the stepped piston facing the third chamber in the valve housing so that the valve member is retained in the requested position.

If this effect were to be achieved in the known fluid control valve referred to above, it would be necessary to connect the switch valve to the fluid duct system with which the main valve is associated, at two locations having a pressure differential which was independent of the fluid flow direction. This is frequently impossible, especially in closed systems, and at best it is extremely complicated. In particular, fluid systems having a common delivery pump feeding a plurality of fluid motors through individual control valves and ducts, would require rather long connecting lines which would involve the risk of unduly delayed responses to the order signals.

On the other hand, when employing the present invention, each switch and auxiliary valve may be built together with the associated main valve in a compact unit, since they are both connected directly to the chambers of that valve. Experience shows that in this way it is possible to obtain a valve which responds exceptionally rapidly to a control order signal and which can be relied upon to maintain the required position of the valve member until it receives a new order notwithstanding transient or lasting reversals of the flow direction which may occur during this period. The advantages gained are, inter alia, of great practical importance in hydraulic or pneumatic systems in which a sequence of operations are to be performed in quick succession, especially when the start of each operation shall be controlled directly in response to the termination of the preceding operation.

According to a feature of the invention, the area of the smaller surface of the stepped piston may be substantially equal to the area of the valve seat and half the size of the area of the larger surface of the stepped piston. By this feature it is achieved, inter alia, that the magnitude of the resultant force actuating the valve member for either opening or closing is independent of the fluid flow direction.

BRIEF DESCRIPTION OF THE DRAWING

The invention will now be described in greater detail with reference to the diagrammatic drawing in which.

DETAILED DESCRIPTION

Figure 1:
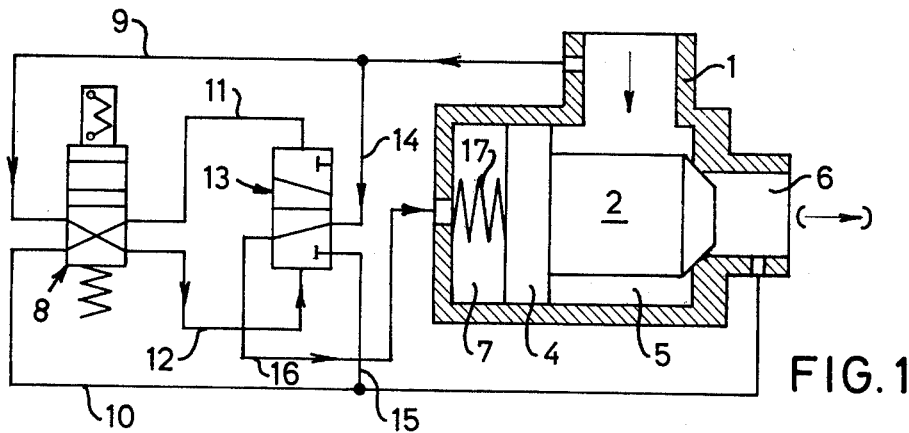
FIGS. 1 to 3 show an embodiment of the valve according to the invention with its components in three different positions.

The valve illustrated in the drawing comprises a housing 1 with an axially displaceable valve member 2 which at one end, i.e. to the right in the figures of the drawing, cooperates with a valve seat 3 formed in the housing 1. The opposite end of valve member 2 is integral with a piston 4 which fits sealingly in a cylindrical bore in the valve housing. Between the piston 4 and the seat 3 a first chamber 5 is formed, and a second chamber 6 is located to the right of the seat 3. Between the piston 4 and the closed end of the valve housing 1 a third chamber 7 is defined. The two chambers 5 and 6 of the valve housing are intended for being connected to a fluid duct, the flow through which is controlled by means of the valve, and, as will be explained in greater detail below, the flow direction in the connected duct may be optional. As indicated by means of arrows, chamber 5 is the inlet chamber of the valve as shown in FIGS. 1 and 2, whereas in FIG. 3 it is the outlet chamber.

A solenoid actuated and spring-biased two-position pilot or switch valve 8 has four ports. Two of the ports which are herein called inlet ports, are via ducts 9 and 10, respectively, separately connected to either of chambers 5 and 6. The two other ports which are herein called outlet ports, are via ducts 11 and 12 connected to either end of a two-position three-way auxiliary valve 13 having a first and a second port, which via branch ducts 14 and 15 are connected to ducts 9 and 10, respectively, and a third port which via a duct 16 is connected to chamber 7 in the valve housing 1. The valve member, not shown, of valve 13 is formed as a reciprocating slide the opposed ends of which are subjected to the fluid pressures transmitted by ducts 11 and 12, respectively. A compression spring 17 mounted in chamber 7 biases the stepped piston 4 and valve member 2 rigidly connected thereto in the direction towards the closed position as shown in FIG. 1.

FIG. 1 illustrates the main valve 1,2 and the associated switch and auxiliary valves 8 and 13 in the position in which the switch valve 8 is set for closing the main valve and in which the chamber 5 is the inlet chamber to the valve housing 1. Consequently, the pressure in chamber 5 is higher than in chamber 6, and via the ducts 9, 12 and 10, 11, respectively, these two pressures act upon either end of the slide valve member of auxiliary valve 13 to maintain said valve member in the position in which the relatively high inlet pressure prevailing in inlet chamber 5 is transmitted to chamber 7 via ducts 9, 14 and 15. Consequently, piston 4 and valve member 2 are urged to the right in FIG. 1, not only by the spring 17, but also by a force resulting from the different fluid pressures, so that the valve member is held in contact against the seat 3.

Figure 2:
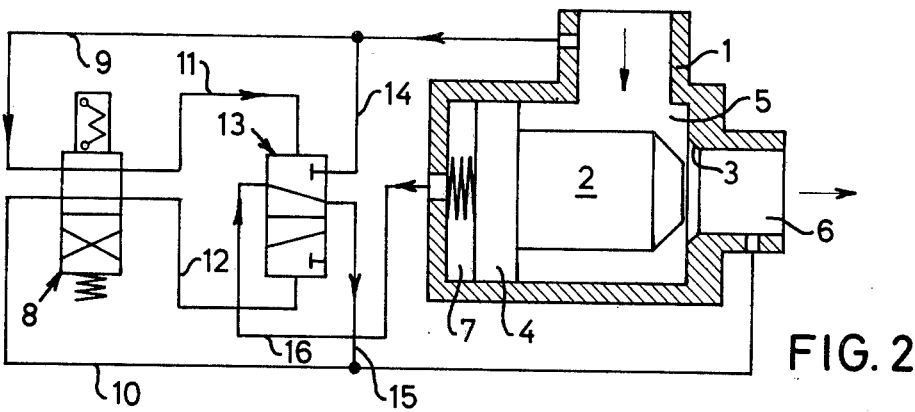

If in this situation an order signal to open the main valve is given, that is to say that the solenoid of switch valve 8 is energized, this valve switches to the position shown in FIG. 2. Thus, the connections between the associated inlet ducts 9, 10 and outlet ducts 11, 12 are interchanged so that the slide of the auxiliary valve 13 is now subjected to an oppositely directed fluid force which displaces it into its opposite end position. The connection through valve 13 between ducts 14 and 16 is cut off, and instead duct 16 is connected to duct 15 and via duct 10 to the chamber 6, in which the relatively low pressure on the downstream or outlet side of the main valve 1,2 prevails. The resulting pressure drop in chamber 7 causes a reversal of the direction of the resultant fluid force on valve member 2 and piston 4, and provided that the resultant force is able to overcome the force of the spring 17, the valve member is displaced towards the left and thereby admits a flow through the valve.

Figure 3:
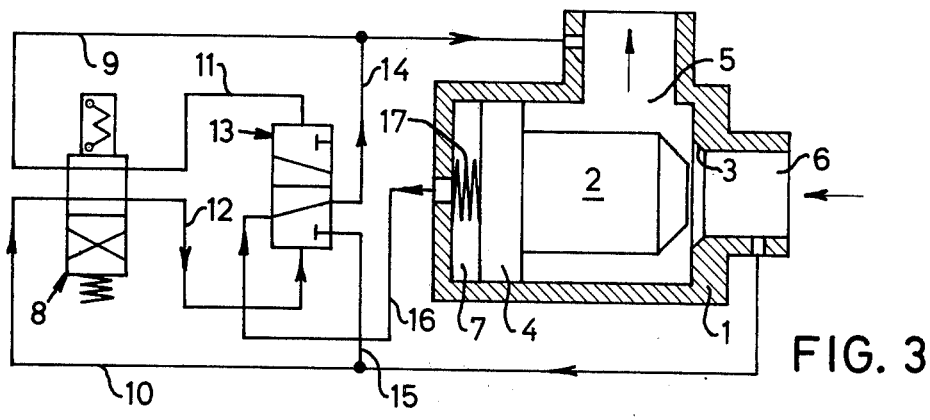

FIG. 3 illustrates the situation in which the switch valve 8 still receives an order signal to keep the main valve 1,2 open, but in which the flow direction through the valve is the reverse of that shown in FIG. 2. Due to this, the pressure is now higher in chamber 6 than in chamber 5, and since the connections between these two chambers and the opposed ends of the slide of valve 13 are unchanged from what is shown in FIG. 2, the slide is now urged in the opposite direction so that it takes up the same position as shown in FIG. 1. Consequently, the third chamber 7 of valve housing 1 is now, via ducts 16 and 14, connected to duct 9 and hence to chamber 5, so that the pressure in chamber 7 is still equal to the pressure on the downstream side of the main valve 1,2, and the resulting force acting on piston 4 and valve member 2 is consequently still directed towards the left so that the valve remains open.

It will be understood that if the annular area of piston 4 facing chamber 5 and the area of the end surface of valve member 2 facing chamber 6, are each equal to one half of the cross-sectional area of chamber 7, the magnitudes of the fluid forces which urge the piston and the valve member towards the left, are independent of the flow direction of the fluid. With increasing flow rate the dynamic pressure acting on the valve member increases, so that the valve member is urged towards the left and the flow area between this member and the valve seat increases while, inversely, the area decreases with decreasing flow rate. By a suitable design of the valve the flow area will be able to adjust itself according to the flow rate in such a way that the pressure drop across the seat is by and large independent of the flow rate. If the valve is used in a hydraulic system including a variable delivery pump, it is possible to achieve a very rapid switching of the valve by combining an order signal to close or open the valve, respectively, with a reduction of increase, respectively, of the delivery rate of the pump, so that the change in the pump delivery promotes the desired displacement of the valve member. In case the current supply to the control circuit of valve 8 fails, the spring of that valve 8 ensures that irrespectively of the pressure conditions in the associated fluid system chamber 7 of the valve housing is always connected to the inlet pressure of the valve housing so that the valve either closes or is maintained in the closed position if it already takes up that position.

It may be mentioned that the control system described above may also, with suitable structural modifications, be used in connection with valves in which the connection of the third chamber of the valve housing to the relatively high pressure on the upstream side of the valve results in the opening of the valve rather than in the closing thereof as described above.

What I claim is:-

1. A fluid flow control valve, comprising in combination:
    a valve housing having a first and a second chamber,
    a valve seat in said housing between said first and second chambers,
    a valve member linearly displaceable in said housing for cooperating with said valve seat,
    a stepped piston rigidly connected to said valve member and having a first active surface subjected to the fluid pressure in said first chamber and an opposed second active surface of larger area, which second piston surface together with said housing defines a third chamber,
    a four-way two-position switch valve having a first inlet port connected to said first chamber, a second inlet port connected to said second chamber, a first outlet port and a second outlet port, and signal receiving means for switching the valve to selectively connect each inlet port with one or the other outlet port, a three-way two-position auxiliary valve having first, second and third ports connected to said first, second and third chamber, respectively, and fluid actuated means for selectively switching said auxiliary valve between a first position in which its said first and third ports are connected, and a second position in which its said second and third ports are connected, and duct means connecting said fluid actuated means to the first and second outlet ports, respectively, of said switch valve.

2. A fluid flow control valve as claimed in claim 1 wherein the area of said first active surface of the stepped piston is substantially equal to the area of said valve seat and half as large as the area of said second active surface of said piston.

3. A fluid flow control valve as claimed in claim 1, further including a spring acting in said third chamber upon said stepped piston for biasing the valve member towards the valve seat.

4. A fluid flow control valve as claimed in claim 1, wherein said means for switching said four-way switch valve includes a solenoid for switching the valve to one position thereof and spring means for biasing the valve towards its other position.

* * * * *